(12) United States Patent
Rao et al.

(10) Patent No.: US 12,454,713 B2
(45) Date of Patent: Oct. 28, 2025

(54) METHOD FOR EFFICIENT BIOSYNTHESIS OF REB D BY GLYCOSYLTRANSFERASE

(71) Applicant: GUILIN LAYN NATURAL INGREDIENTS CORP., Guangxi (CN)

(72) Inventors: Yijian Rao, Wuxi (CN); Baodang Guo, Wuxi (CN); Yan Zhang, Wuxi (CN); Zhenbo Yuan, Wuxi (CN)

(73) Assignee: GUILIN LAYN NATURAL INGREDIENTS CORP., Guangxi (CN)

( * ) Notice: Subject to any disclaimer, the term of this patent is extended or adjusted under 35 U.S.C. 154(b) by 398 days.

(21) Appl. No.: 18/176,694

(22) Filed: Mar. 1, 2023

(65) Prior Publication Data

US 2023/0212631 A1    Jul. 6, 2023

Related U.S. Application Data (63) Continuation of application No. PCT/CN2022/070743, filed on Jan. 7, 2022.

(30) Foreign Application Priority Data

Nov. 17, 2021   (CN) .......................... 202111360870.6

(51) Int. Cl.
*C12P 19/56* (2006.01)
*C12N 9/10* (2006.01)

(52) U.S. Cl.
CPC ............ *C12P 19/56* (2013.01); *C12N 9/1051* (2013.01); *C12N 9/1062* (2013.01); *C12Y 204/01155* (2013.01)

(58) Field of Classification Search
CPC ........ C12P 19/56; C12P 19/18; C12N 9/1051; C12N 9/1062; C12N 9/10; C12N 9/1048; C12N 15/70; C12Y 204/01155; C12Y 204/01013; C12Y 204/01; C12R 2001/125; C12R 2001/19
See application file for complete search history.

(56) References Cited

FOREIGN PATENT DOCUMENTS

| CN | 106350565 A | 1/2017 | |
| --- | --- | --- | --- |
| CN | 110846363 A | 2/2020 | |
| CN | 111518782 A | * 8/2020 | ............... C12P 19/56 |
| CN | 113462670 A | 10/2021 | |
| EP | 3034614 A1 | 6/2016 | |

OTHER PUBLICATIONS

Luo SL, Dang LZ, Zhang KQ, Liang LM, Li GH. Cloning and heterologous expression of UDP-glycosyltransferase genes from Bacillus subtilis and its application in the glycosylation of ginsenoside Rh1. Letters in Applied Microbiology. Jan. 1, 2015;60(1):72-8. (Year: 2015).*

Liu B, Zhao C, Xiang Q, Zhao N, Luo Y, Bao R. Structural and biochemical studies of the glycosyltransferase Bs-YjiC from Bacillus subtilis. International Journal of Biological Macromolecules. Jan. 1, 2021;166:806-17. (Year: 2021).*

Fei, liwen et. al. "Construction of in situ UDPG regeneration strain for biosynthesis of rebaudioside D" Food Science, vol. 39, No. 22, Dec. 31, 2018.

Yang, yufeng et. al. "Production of rebaudioside D by recombinant *Escherichia coli* whole cell catalyst" Industrial Microbiology, vol. 47 No. 5 Oct. 31, 2017.

Wang, yu et. al. "Comparative transcriptiomic of Stevia rebaudiana provide insight into rebaudioside D and rebaudioside M biosynthesis" Plant physiology and biochemistry, 167 (Aug. 17, 2021) 541-549.

* cited by examiner

*Primary Examiner* — Jennifer M. H. Tichy
*Assistant Examiner* — Emily F Eix
(74) *Attorney, Agent, or Firm* — JCIPRNET (57) ABSTRACT

The disclosure discloses a method for efficient biosynthesis of Reb D by glycosyltransferase, belonging to the field of biocatalytic synthesis. According to the disclosure, a glycosyltransferase having an activity to catalyze synthesis of Reb D from Reb A is obtained, and a mutant YojK-1241T/G327N with high catalytic activity is obtained through directed evolution. The glycosyltransferase mutant YojK-1241T/G327N and a sucrose synthase AtSuSy derived from *Arabidopsis thaliana* are used for constructing a coupling reaction to realize efficient catalytic synthesis of Reb D with Reb A as a substrate. The reaction is carried out by using 19.32 g/L (20 mmol/L) of Reb A as the substrate for 15 h to efficiently synthesize 20.59 g/L of Reb D, and the yield of Reb D reaches 91.29%, which provides an efficient and green new pathway for production of Reb D.

11 Claims, 9 Drawing Sheets
Specification includes a Sequence Listing.

SEQUENCE LISTING

```
Sequence total quantity: 2
SEQ ID NO: 1                 moltype = AA  length = 405
FEATURE                      Location/Qualifiers
source                       1..405
                             mol_type = protein
                             organism = synthetic construct
SEQUENCE: 1
MANVLMIGFP GEGHINPSIG VMKELKSRGE NITYYAVKEY KEKITALDIE FREYHDFRGD   60
YFGKNATGDE ERDFTEMLCA FLKACKDIAT HIYEEVKHES YDYVIYDHHL LAGKVIANML  120
KLPRFSLCTT FAMNEEFAKE MMGAYMKGSL EDSPHYESYQ QLAETLNADF QAEIKKPFDV  180
FLADGDLTIV FTSRGFQPLA EQFGERYVFV GPSITERAGN NDFPFDQIDN ENVLFISMGT  240
TFNNQKQFFN QCLEVCKDFD GKVVLSIGKH IKTSELNDIP ENFIVRPYVP QLEILKRASL  300
FVTHGGMNST SEGLYFETPL VVIPMGNDQF VVADQVEKVG AGKVIKKEEL SESLLKETIQ  360
EVMNNRSYAE KAKEIGQSLK AAGGSKKAAD SILEAVKQKT QSANA                 405

SEQ ID NO: 2                 moltype = AA  length = 808
```

```
FEATURE          Location/Qualifiers
source           1..808
                 mol_type = protein
                 organism = Arabidopsis thaliana
SEQUENCE: 2
MANAERMITR VHSQRERLNE TLVSERNEVL ALLSRVEAKG KGILQQNQII AEFEALPEQT   60
RKKLEGGPFF DLLKSTQEAI VLPPWVALAV RPRPGVWEYL RVNLHALVVE ELQPAEFLHF  120
KEELVDGVKN GNFTLELDFE PFNASIPRPT LHKYIGNGVD FLNRHLSAKL FHDKESLLPL  180
LKFLRLHSHQ GKNLMLSEKI QNLNTLQHTL RKAEEYLAEL KSETLYEEFE AKFEEIGLER  240
GWGDNAERVL DMIRLLLDLL EAPDPCTLET FLGRVPMVFN VVILSPHGYF AQDNVLGYPD  300
TGGQVVYILD QVRALEIEML QRIKQQGLNI KPRILILTRL LPDAVGTTCG ERLERVYDSE  360
YCDILRVPFR TEKGIVRKWI SRFEVWPYLE TYTEDAAVEL SKELNGKPDL IIGNYSDGNL  420
VASLLAHKLG VTQCTIAHAL EKTKYPDSDI YWKKLDDKYH FSCQFTADIF AMNHTDFIIT  480
STFQEIAGSK ETVGQYESHT AFTLPGLYRV VHGIDVFDPK FNIVSPGADM SIYFPYTEEK  540
RRLTKFHSEI EELLYSDVEN KEHLCVLKDK KKPILFTMAR LDRVKNLSGL VEWYGKNTRL  600
RELANLVVVG GDRRKESKDN EEKAEMKKMY DLIEEYKLNG QFRWISSQMD RVRNGELYRY  660
ICDTKGAFVQ PALYEAFGLT VVEAMTCGLP TFATCKGGPA EIIVHGKSGF HIDPYHGDQA  720
ADTLADFFTK CKEDPSHWDE ISKGGLQRIE EKYTWQIYSQ RLLTLTGVYG FWKHVSNLDR  780
LEARRYLEMF YALKYRPLAQ AVPLAQDD                                    808
```

METHOD FOR EFFICIENT BIOSYNTHESIS OF REB D BY GLYCOSYLTRANSFERASE

REFERENCE TO SEQUENCE LISTING

The instant application contains a Sequence Listing in XML format as a file named "YGHY-2022-63-SEQ.xml", created on Dec. 15, 2022, of 4 kB in size, and which is hereby incorporated by reference in its entirety.

TECHNICAL FIELD

The disclosure relates to a method for efficient biosynthesis of Rebaudioside D (Reb D) by glycosyltransferase, belonging to the field of biocatalytic synthesis.

BACKGROUND

Excessive intake of high-calorie sugars has led to severe obesity, diabetes, hypertension and cardiovascular and cerebrovascular diseases all over the world. Therefore, steviol glycosides from *Stevia rebaudiana* have received wide attention because of their high sweetness, low calorie and high safety. Among them, stevioside and Reb A, which are rich in content, have been widely used as sweeteners in the fields of beverages, food, etc. They are 250-300 times as sweet as sucrose, but the bitter aftertaste besides the sweetness severely affects their taste as a sweetener. Reb D, which is lower in content in the steviol glycosides, has higher sweetness than Reb A and stevioside and lower bitter aftertaste besides sweetness, and therefore, it tastes better as a sweetener and is considered to be a promising next-generation sweetener. However, the content of Reb D in dried leaves of *Stevia rebaudiana* is only 0.4%-0.5%, which is only about one-tenth of the content of Reb A. This makes the traditional method of extracting Reb A from leaves not suitable for the extraction of Reb D. The complicated and complex extraction method makes it difficult to achieve large-scale production and meet the market demand only by extraction from leaves of *Stevia rebaudiana*.

At present, enzymatic synthesis of Reb D by using Reb A having a higher content in the *Stevia rebaudiana* as a substrate is considered to be a feasible technical route to increase Reb D production. Through continuous research and exploration by relevant scientists, glycosyltransferases (EUGT11, UGT91D2 and UGTSL2) related to the synthesis of Reb D with Reb A as the substrate have been explored and identified. The heterologous expression of these glycosyltransferases and the heterologous biosynthesis of Reb D are realized by microorganisms such as *Escherichia coli*. However, these plant-derived glycosyltransferases, when heterologously expressed in microorganisms, especially in prokaryotic microorganisms, mainly exists in the form of inclusion bodies and have low enzyme activity. Whole cell catalysis is often used in the reaction system, and additional chemical reagents such as a cell permeabilizer is required, which is not green or environmental-friendly. These defects limit the use of glycosyltransferases in heterologous biosynthesis of Reb D and make it difficult to achieve large-scale production. Therefore, exploration of glycosyltransferases that can be solubly expressed well in prokaryotic microorganisms such as *E. coli* and that have higher catalytic activity to achieve large-scale production of Reb D from Reb A and meet the market demand is of great importance.

SUMMARY

In order to solve the above problems, the disclosure explores a glycosyltransferase YojK from *Bacillus subtilis* BS168 to catalyze synthesis of Reb D from Reb A. This enzyme can realize soluble and efficient expression in *E. coli*, and has the activity to catalyze the synthesis of Reb D from Reb A in the presence of uridine diphosphate glucose (UDPG). Through directed evolution based on protein structure, an efficient mutant is successfully obtained. By constructing a uridine diphosphate glucose (UDPG) recycle system, efficient biosynthesis of Reb D is realized by using *E. coli* lysate, and a novel method for biosynthesis of Reb D is provided.

In order to solve the above technical problems, the technical solutions adopted by the disclosure are as follows:

A first objective of the disclosure is to provide a glycosyltransferase. An amino acid sequence of the glycosyltransferase is shown in SEQ ID NO.1.

A second objective of the disclosure is to provide a gene encoding the glycosyltransferase.

A third objective of the disclosure is to provide an expression vector carrying the gene encoding the glycosyltransferase.

In one embodiment, the expression vector is pET-21b(+).

A fourth objective of the disclosure is to provide a recombinant strain expressing the glycosyltransferase.

In one embodiment, the recombinant strain also expresses a sucrose synthase.

In one embodiment, an amino acid sequence of the sucrose synthase is an amino acid sequence with sucrose synthase activity derived from any source.

In one embodiment, an NCBI accession number of the amino acid sequence of the sucrose synthase is NP_001031915 (SEQ ID NO. 2).

In one embodiment, the recombinant strain uses *E. coli* as a host cell and pACYCDuet-1 as an expression vector.

A fifth objective of the disclosure is to provide a method for catalytic synthesis of Reb D, which includes carrying out a catalytic reaction on Reb A as a substrate by using a cell lysis buffer of the recombinant strain.

In one embodiment, the cell lysis buffer is a supernatant obtained by cell lysis after induced expression of the recombinant strain.

In one embodiment, conditions of the catalytic reaction are as follows: in a reaction system containing 1-50 mmol/L of Reb A, 0-800 mmol/L of sucrose, 5-25% (v/v) of DMSO, 100 mmol/L of $K_2HPO_4$—$KH_2PO_4$ buffer and 100 mmol/L of NaCl, a glycosylation reaction is carried out at 20-45° C. for 0-48 h.

In one embodiment, the reaction system further contains uridine diphosphate glucose.

In one embodiment, the cell lysis buffer is added to the reaction system in an amount of 40 mg/mL.

In one embodiment, the buffer has a pH of 5.5-9.0.

In one embodiment, a preparation method of the cell lysis buffer includes: centrifuging a fermentation liquid of the recombinant strain to obtain cells, washing the cells with a buffer, and resuspending cell with the buffer and 100 mmol/L of NaCl, and carrying out crushing and centrifuging to obtain the cell lysis buffer.

In one embodiment, the buffer is a 100 mmol/L $K_2HPO_4$—$KH_2PO_4$ buffer.

The disclosure further protects use of the glycosyltransferase or the gene or the expression vector or the microbial cells or the recombinant strain or the method in preparation of a product containing Reb D.

Beneficial Effects:

(1) According to the disclosure, a nucleic acid sequence encoding the glycosyltransferase YojK is used for preparing the recombinant protein capable of catalyzing production of Reb D from Reb A, and the prepared recombinant protein can glycosylate the substrate Reb A by using UDPG as a glycosyl donor to synthesize Reb D.

(2) According to the disclosure, by carrying out site-directed mutagenesis on the amino acid sequence of the glycosyltransferase YojK, a mutant YojK-I241T/G327N (SEQ ID NO.1) obtained by using UDPG as the glycosyl donor significantly improves the efficiency of catalytic synthesis of Reb D from Reb A, and has greatly improved catalytic activity which is 7.35 times higher than that of wild type enzymes.

(3) According to the disclosure, a nucleotide sequence encoding the glycosyltransferase wild type YojK or mutant YojK-I241T/G327N and a nucleotide sequence encoding the sucrose synthase AtSuSy are linked to pACYCDuet-1 to construct a recombinant plasmid. By optimizing conditions of the coupling reaction system, 20.59 g/L of Reb D is synthesized from 19.32 g/L (20 mmol/L) of Reb A with a high yield of 91.29%.

(4) According to the disclosure, the constructed recombinant strain co-expresses the glycosyltransferase mutant derived from *B. subtilis* and the sucrose synthase derived from *Arabidopsis thaliana*, and the cell lysis buffer obtained by induced expression of the recombinant strain is used for catalyzing the synthesis of Reb D from Reb A, so there is no need to add glycosyl donors or use additional cell permeabilizers, which significantly reduces the cost and is green and environmental-friendly.

DETAILED DESCRIPTION

The disclosure will be described in detail below with reference to the accompanying drawings and specific examples. However, the examples are not intended to limit the disclosure in any form. Unless otherwise specified, reagents, methods and equipment used in the disclosure are conventional reagents, methods and equipment in the art.

Unless otherwise specified, the reagents and materials used in the following examples are commercially available commodities or can be prepared by known methods.

EXAMPLE 1 ACQUISITION OF GLYCOSYLTRANSFERASE YOJK GENE AND CONSTRUCTION OF MUTANT AND RECOMBINANT STRAIN

An amino acid sequence (accession number: WP_004399256.1) and a nucleic acid sequence (accession number: CP053102.1) of *B. subtilis* BS168 glycosyltransferase were downloaded from Genbank, and the gene was synthesized by Yixin Biotechnology Co., Ltd. and linked to a multiple cloning site of a vector pET-21b(+) to obtain a recombinant plasmid pET-21b(+)-YojK.

With the recombinant plasmid pET-21b(+)-YojK as a template, whole plasmid PCR was carried out by using primers 1241T-F/1241T-R and G327N-F/G327N-R (the primers are shown in Table 1) to obtain a recombinant plasmid pET-21b(+)-YojK-1241T/G327N carrying the mutant.

The obtained plasmids pET-21b(+)-YojK and pET-21b(+)-YojK-1241T/G327N were sequenced for identification and respectively transformed into *E. coli* BL21 (DE3) competent cells, and an LB solid plate (10 g/L of peptone, 5 g/L of tryptone, 10 g/L of NaCl and 20 g/L of agar powder) containing 100 μg/mL of ampicillin was used for screening to obtain recombinant strains *E. coli* BL21 (DE3) pET-21b(+)-YojK and *E. coli* BL21 (DE3) pET-21b(+)-YojK-1241T/G327N.

With the recombinant plasmid pET-21b(+)-YojK as a template, whole plasmid PCR was carried out by using primers G327N-F/G327N-R (the primers are shown in Table 1) to obtain a recombinant plasmid pET-21b(+)-YojK-G327N carrying the mutant. The recombinant strain *E. coli* BL21 (DE3) pET-21b(+)-YojK-G327N was obtained by the same method.

TABLE 1

Primer names and primer sequences

| Primer Name | Primer Sequence |
| --- | --- |
| I241T-F | TTCAATGGGAACCACTTTTAATAATCAAAAGC |
| I241T-R | GCTTTTGATTATTAAAAGTGGTTCCCATTGAA |
| G327N-F | CGATGGGAAATGACCAATTTGTTGTCGCAGATCAGGTA |
| G327N-R | ATTGGTCATTTCCCATCGGAATGACAACGAGC |

EXAMPLE 2 INDUCED EXPRESSION OF RECOMBINANT STRAIN AND PURIFICATION OF TARGET PROTEIN

The recombinant strain *E. coli* BL21 (DE3) pET-21b(+)-YojK or the mutant *E. coli* BL21 (DE3) pET-21b(+)-YojK-1241T/G327N constructed in Example 1 was inoculated into 1 L of TB liquid medium (12 g/L of peptone, 24 g/L of tryptone, 5 g/L of glycerol, 2.32 g/L of $KH_2PO_4$ and 12.53 g/L of $K_2HPO_4$) containing 100 μg/mL of ampicillin, and cultured under the conditions of 135 rpm and 37° C. until $OD_{600}$ was 0.6-0.8. Then the culture temperature was reduced to 18° C., isopropyl-β-thiogalactoside (IPTG) with a final concentration of 0.1 mmol/L was added, and induced culture was carried out for 8 h.

The bacterial solution obtained by induced expression was centrifuged (7000 rpm, 7 min, 4° C.), the supernatant was discarded, and the cells were collected. The cells were resuspended with a lysis buffer (50 mmol/L of Tris-HCl with pH 8.0, 300 mmol/L of NaCl, 10 mmol/L of imidazole, 10% of glycerol) according to 1 g cells/10 mL lysis buffer. The resulting bacterial solution was crushed with a high-pressure homogenizer. Then the crushed bacterial solution was centrifuged (40000×g, 30 min), and the supernatant was taken to obtain a crude enzyme solution.

Figure 1A:
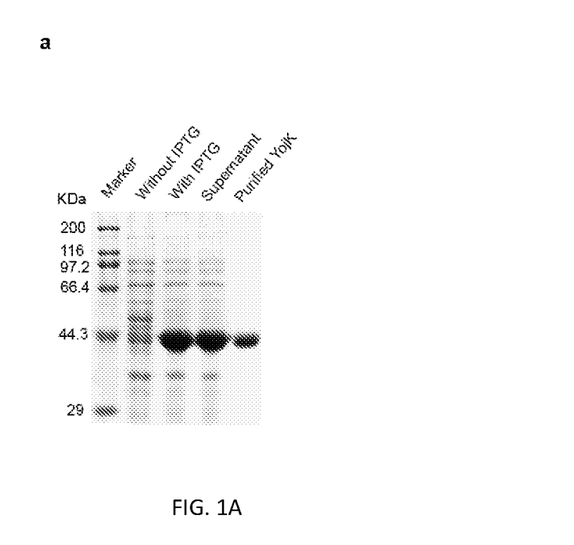
FIG. 1A shows protein expression and purification analysis of the glycosyltransferase YojK.
Figure 1B:
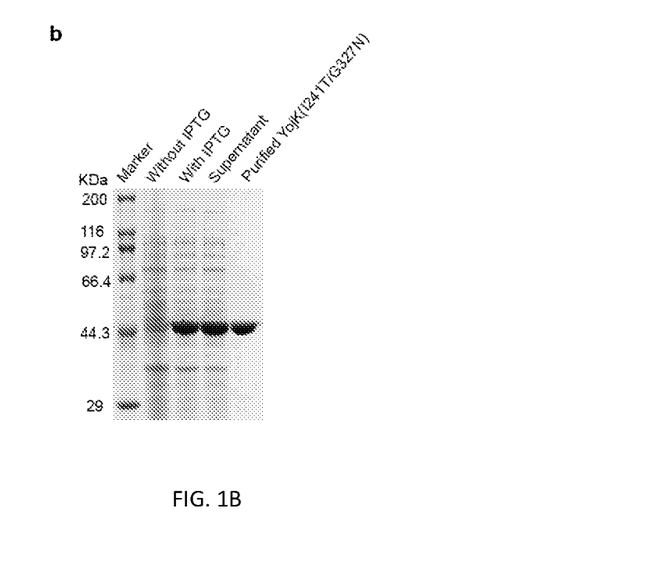
FIG. 1B shows protein expression and purification analysis of the glycosyltransferase mutant YojK-I241T/G327N.

The crude enzyme solution was purified by affinity chromatography with a Ni$^+$ column. After loading was completed, 10 times of volume of lysis buffer was used for rinsing out miscellaneous proteins, and elution of the target protein was carried out with an elution buffer. The target protein obtained by elution was collected, and desalted through a desalting column (Histrp™ 5 ml Desalting) with a desalting buffer (25 mmol/L of Tris-HCl, 150 mmol/L of NaCl, 10% of glycerol). After the completion of desalting, the solution was concentrated to 10 mg/ml for subsequent reaction. The purified protein was detected by 10% SDS-PAGE gel electrophoresis. The result is shown in FIG. 1A and FIG. 1B. A pure enzyme with clear target band and accurate protein size was successfully obtained.

The enzyme activity was determined in a 200 μL system. The reaction system contained 4 mM of Reb A, 10 mM of UDPG, 10 mM of MnCl$_2$, a proper amount of wild type YojK or a mutant thereof and 50 mM of Tris-HCl with pH 8.0. After 20 min of reaction at 35° C., the enzyme was inactivated by heating at 95° C. for 5 min immediately. Next, 5 times of volume of methanol was added for dilution, the solution was centrifuged at 20000×g for 5 min, and the supernatant was filtered through a 0.22 μm organic filter membrane. A resulting sample was analyzed using an ultra-high performance liquid chromatography (UPLC) system. The amount of Reb D produced was calculated according to a Reb D concentration standard curve, and enzyme activities of YojK and the mutants YojK-1241T/G327N and YojK-G327N were calculated. Triplicate experiments were carried out for each reaction. The enzyme activities of the wild type enzyme YojK and the mutant enzymes YojK-1241T/G327N and YojK-G327N were 8 mU/mg, 59.8 mU/mg and 34.4 mU/mg respectively.

EXAMPLE 3 SYNTHESIS OF REB D BY YOJK-CATALYZED GLYCOSYLATION FROM REB A

The purified wild type enzyme YojK and the mutant YojK-1241T/G327N obtained in Example 2 was subjected to glycosylation.

Glycosylation was carried out in a 200 μL reaction system. The reaction system included 50 mmol/L of Tris-HCl with pH 8.0, 5 mmol/L of UDPG, 10 mmol/L of MnCl$_2$ and 1 mmol/L of Reb A. The concentration of the pure enzyme YojK or YojK-1241T/G327 obtained in Example 2 was 10 μM. The reaction was carried out at 35° C. for 20 min. After the completion of the reaction, a resulting solution was diluted with equal volume of methanol, and centrifuged at 20000×g for 5 min. The supernatant was subjected to suction filtration through a 0.22 μM filter membrane, and ultra-high performance liquid chromatography (UPLC) was carried out for detection and analysis. During the UPLC, a BEH C18 1.7 μM reverse phase column from waters Corporation was used, the injection volume was 4 μL, the column temperature was 40° C., the mobile phase was acetonitrile in Tube A and a 1.38 g/L NaH$_2$PO$_4$ buffer (pH 2.6) in Tube B, and the flow rate was 0.3 mL/min. The specific process is shown in Table 2:

TABLE 2

| UPLC reaction process | | |
|---|---|---|
| Time (min) | Acetonitrile | 1.38 g/L NaH$_2$PO$_4$ (pH 2.6) |
| 0 | 15% | 85% |
| 1 | 15% | 85% |
| 2 | 27% | 73% |
| 6 | 33% | 67% |

Figure 2:
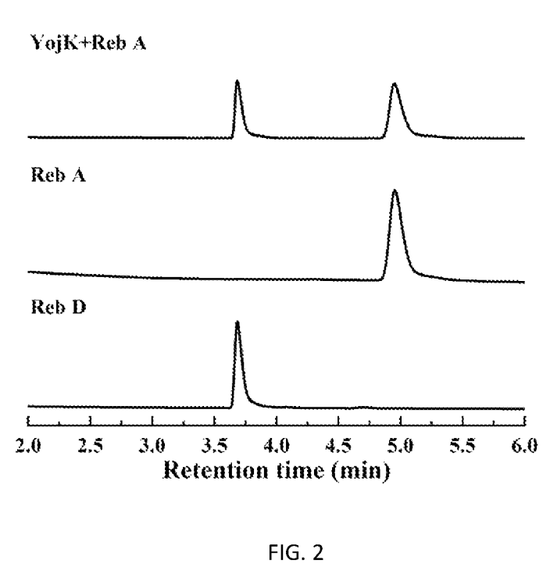
FIG. 2 is a UPLC analysis of the conversion of Reb A catalyzed by YojK.
Figure 3:
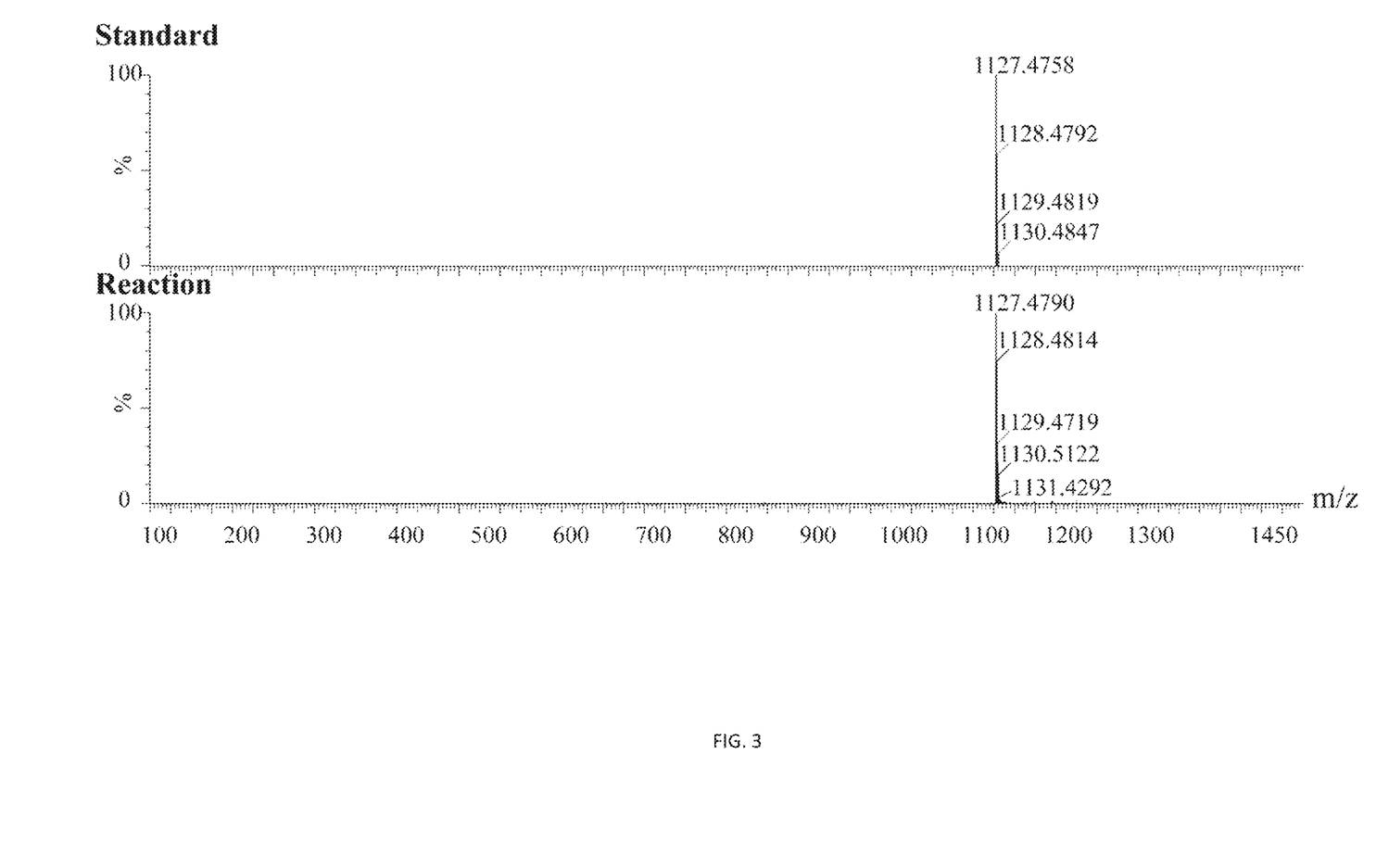
FIG. 3 shows LC-MS analysis of the new product after glycosylating Reb A by YojK. HRMS (ESI$^-$) calculated for $C_{50}H_{80}O_{28}$ [M–H]$^-$: 1127.4758; Found: 1127.4790.
Figure 4:
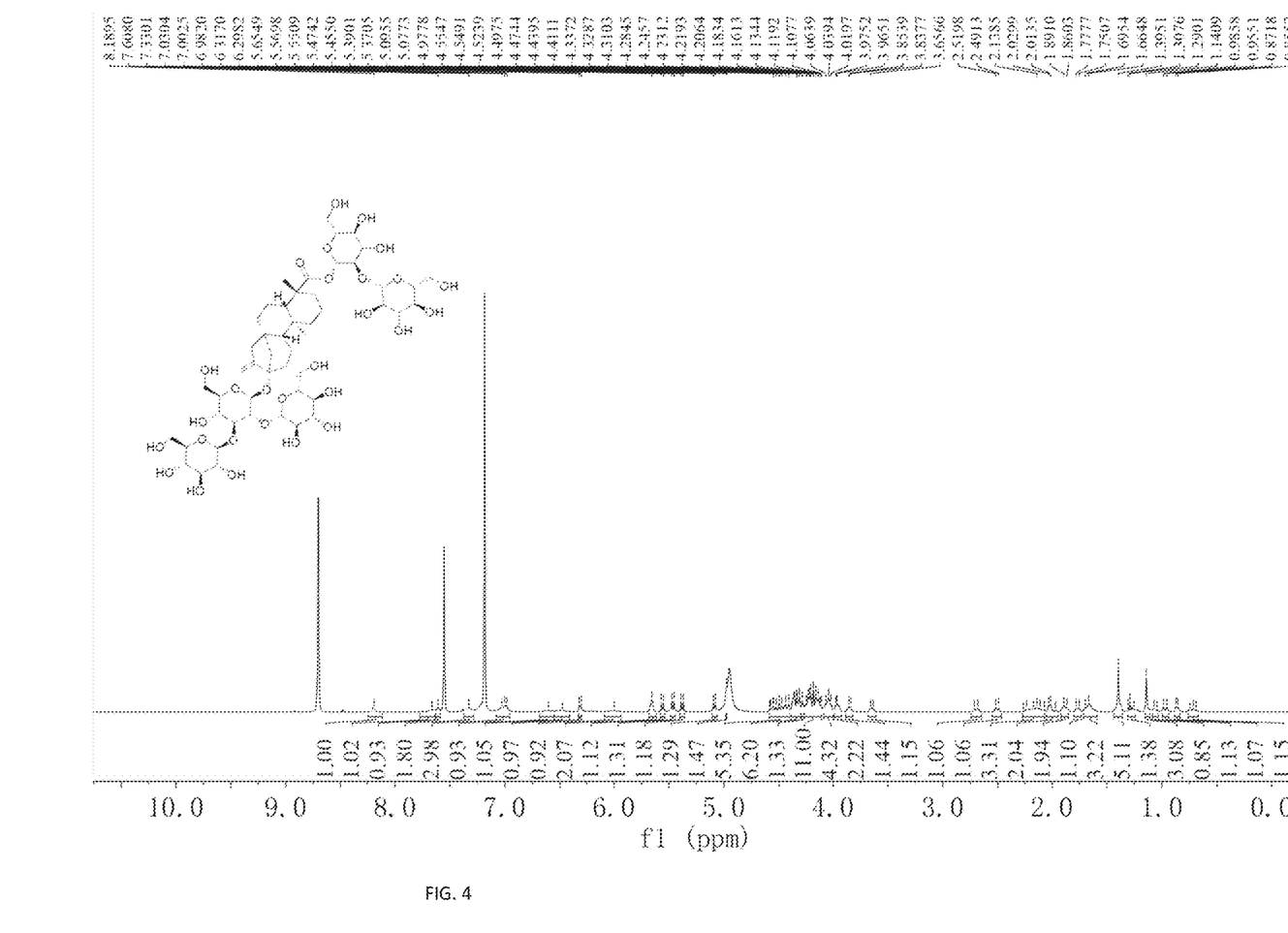
FIG. 4 shows the 1H NMR spectrum of Reb D in Pyridine-d5 (600 MHz).
Figure 5:
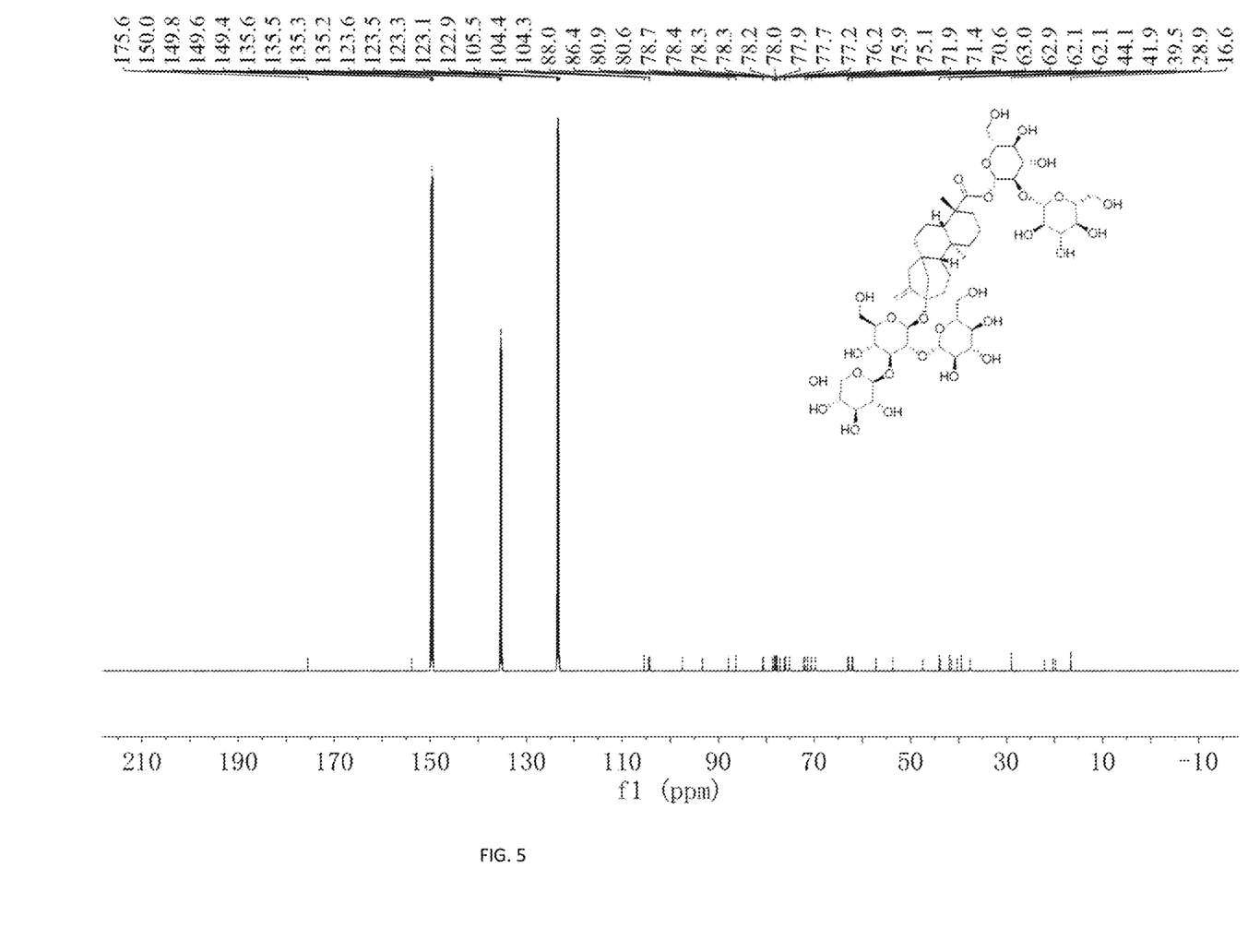
FIG. 5 shows the 13C NMR spectrum of Reb D in Pyridine-d5 (151 MHZ).

Liquid chromatography was performed. The result is shown in FIG. 2. Compared with Reb A and Reb D standards, there was obviously a new product with the same retention time as Reb D produced in the reaction system. In combination with mass spectrometry (MS) (FIG. 3) and nuclear magnetic resonance spectroscopy (NMR) (FIG. 4 and FIG. 5), the results indicated that the glycosyltransferase YojK could catalyze glycosylation of the Reb A substrate by using the UDPG as the glycosyl donor to produce Reb D. This example proved that the glycosyltransferase YojK had the catalytic activity to catalyze production of Reb D from Reb A.

EXAMPLE 4 CATALYTIC SYNTHESIS OF REB D FROM REB A USING GLYCOSYLTRANSFERASE MUTANT YojK-1241T/G327N WITH HIGH CATALYTIC ACTIVITY

The purified mutant enzyme YojK-1241T/G327N obtained in Example 2 was subjected to glycosylation.

Figure 6:
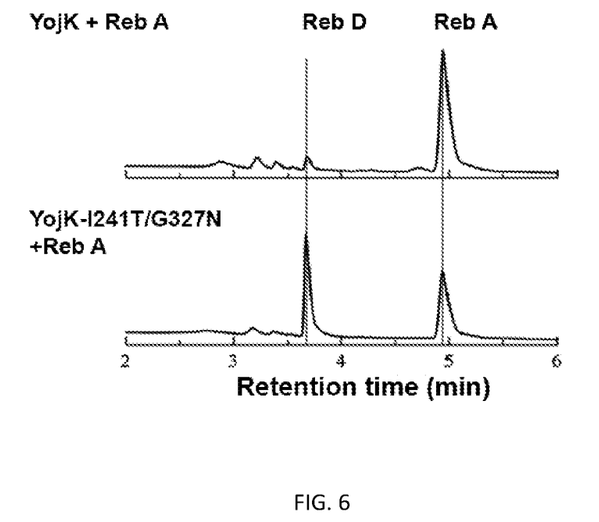
FIG. 6 shows UPLC analysis of the conversion of Reb A catalyzed by YojK and Yojk-241T/G327N.

The glycosylation was carried out in a 200 μL reaction system. The reaction system included 50 mmol/L of Tris-HCl with pH 8.0, 10 mmol/L of UDPG, 10 mmol/L of MnCl$_2$ and 4 mmol/L of Reb A. The concentration of the pure enzyme YojK or YojK-1241T/G327N obtained in Example 2 was 0.45 mg/mL. The reaction was carried out at 35° C. for 20 min. After the completion of the reaction, 5 times of volume of methanol was added to terminate the reaction, and a resulting solution was centrifuged at 20000×g for 5 min. The supernatant was subjected to suction filtration through a 0.22 μM filter membrane, and ultra-high performance liquid chromatography (UPLC) was carried out for detection and analysis. The liquid chromatography was carried out as described in Example 3. As can be seen from the liquid chromatogram (FIG. 6), compared with the wild type Yojk, the catalytic activity of the mutant YojK-G327N was 4.3 times that of the wild type YojK, and the catalytic activity of the mutant YojK-1241T/G327N was greatly improved, which was 7.35 times that of the wild type YojK.

EXAMPLE 5 CONSTRUCTION OF RECOMBINANT PLASMID AND RECOMBINANT STRAIN OF GLYCOSYLTRANSFERASE AND SUCROSE SYNTHASE

An amino acid sequence (accession number: NP_001031915) (SEQ ID NO. 2). and a nucleic acid sequence (accession number: NM_001036838.2) of sucrose synthase AtSuSy derived from *Arabidopsis thaliana* were downloaded from Genbank, and optimization of the *E. coli* preferred codon and synthesis of the gene were carried out by Yixin Biotechnology Co., Ltd. The gene YojK-1241T/G327N encoding the glycosyltransferase mutant and the gene AtSuSy encoding the sucrose synthase were linked to a multiple cloning site of pACYCDuet-1 to construct a mutant recombinant plasmid pACYCDuet-1-YojK-1241T/G327N-AtSuSy. The obtained plasmid was sequenced for identification, and transformed into *E. coli* BL21 (DE3) competent cells. An LB solid plate (10 g/L of peptone, 5 g/L of tryptone, 10 g/L of NaCl and 20 g/L of agar powder) containing 100 μg/mL of chloramphenicol was used for screening to obtain the recombinant strain *E. coli* BL21 (DE3) pACYCDuet-1-YojK-1241T/G327N-AtSuSy.

EXAMPLE 6 PREPARATION OF CELL LYSIS BUFFER FOR COUPLING REACTION OF GLYCOSYLTRANSFERASE MUTANT AND SUCROSE SYNTHASE

The recombinant strain *E. coli* BL21 (DE3) pACYCDuet-1-YojK-1241T/G327N-AtSuSy obtained in Example 5 was used as a fermentation strain, and fermentation was carried out in a 7 L fermentor. A monoclonal antibody was inoculated to 5 mL of LB medium containing 34 μg/mL of chloramphenicol, cultured at 37° C. and 200 rpm overnight, transferred according to a proportion 1:100 to 100 ml of LB medium containing 34 μg/mL of chloramphenicol, and propagated for 12 h. In strict accordance with the aseptic operation regulations, the cells were inoculated according to a proportion 1:50 to 4 L of TB medium containing 34 μg/L of chloramphenicol, and cultured at 37° C. and 400 rpm until $OD_{600}$ reached 6-8. 0.2 mmol/L of IPTG was added, and induced culture was carried out at 18° C. for 18 h. In the fermentation process, the pH was controlled to about 6.86 with phosphoric acid and ammonia water, glycerol was fed as a carbon source, and the dissolved oxygen was controlled at about 30%. The bacterial solution obtained by induced expression was centrifuged (7000 rpm, 7 min, 4° C.), the supernatant was discarded, and the cells were collected. The cells were washed with a potassium phosphate buffer (100 mmol/L of $K_2HPO_4$—$KH_2PO_4$ (KPi) with pH8.0) twice, and resuspended with a potassium phosphate buffer (100 mmol/L of KPi with pH8.0 and 100 mmol/L of NaCl). The resulting suspension was crushed with a high-pressure homogenizer. Then the crushed bacterial solution was centrifuged at 40000×g for 30 min, the supernatant was taken to obtain a cell lysis buffer for coupling reaction, and albumin glue detection was carried out.

Figure 7:
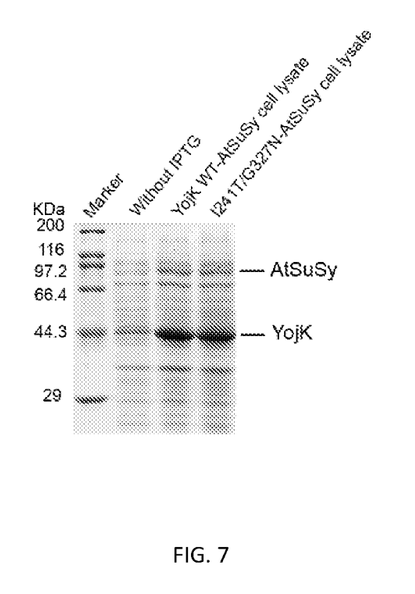
FIG. 7 shows SDS-PAGE analysis of the heterologous expression of YojK and AtSuSy.

The result is shown in FIG. 7. The result showed that both the glycosyltransferase and the sucrose synthase could be well expressed. The protein concentration in the cell lysis buffer was determined using a Nano-Drop 2000 UV-Vis spectrophotometer. The prepared cell lysis buffer was packaged and stored at −80° C., or directly used for coupling reaction.

EXAMPLE 7 EFFECT OF PH ON GLYCOSYLATION COUPLING REACTION OF GLYCOSYLTRANSFERASE AND Sucrose Synthase A glycosylation coupling reaction system was reacted in buffers with different pH values, and the effect of pH on glycosylation coupling reaction of glycosyltransferase and sucrose synthase was determined. The buffers selected were 100 mmol/L of Bis-Tris with pH 5.5-6.0 and 100 mmol/L of NaCl; 100 mmol/L of KPi with pH 6.0-8.0 and 100 mmol/L of NaCl; and 100 mmol/L of Tris-HCl with pH 8.0-9.0 and 100 mmol/L of NaCl.

Figure 8:
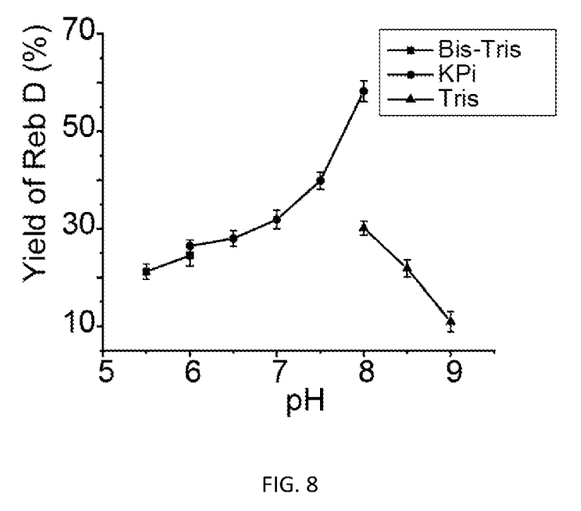
FIG. 8 shows optimization of pH.

The cell lysis buffer for coupling reaction was prepared according to Example 6. 1 ml of glycosylation coupling reaction system containing 40 mg/ml of cell lysis buffer, 20 mmol/L of Reb A, 200 mmol/L of sucrose, and 5% of DMSO (v/v) and the buffer was reacted at 35° C. for 6 h. After the completion of the reaction, 5 times of volume of methanol was added to terminate the reaction. Then methanol was added to make a 6-fold dilution. The diluted solution was centrifuged at 20000×g for 5 min, the supernatant was subjected to suction filtration through a 0.22 μM filter membrane, and UPLC was carried out for detection and analysis. The liquid chromatography was carried out according to Example 3, and the yield of Reb D was calculated. The result showed that when the buffer was 100 mmol/L of KPi with pH 8.0 and 100 mmol/L of NaCl, the yield of Reb D could reach 50% or above (FIG. 8).

EXAMPLE 8 EFFECT OF TEMPERATURE ON GLYCOSYLATION COUPLING REACTION OF GLYCOSYLTRANSFERASE AND SUCROSE SYNTHASE

A glycosylation coupling reaction system was reacted at different temperatures (20-45° C.), and the effect of temperature on glycosylation coupling reaction of glycosyltransferase and sucrose synthase was determined.

Figure 9:
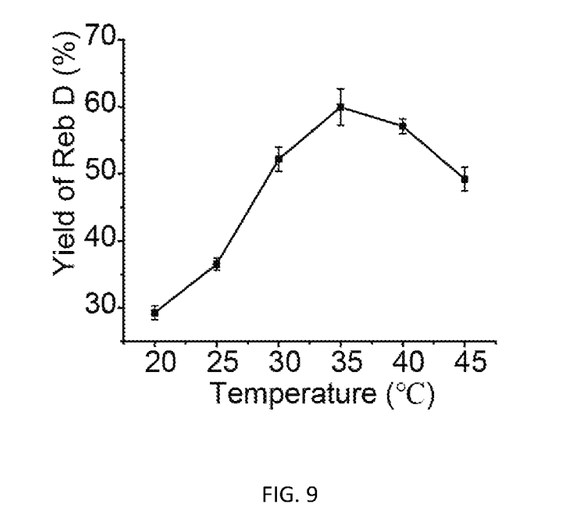
FIG. 9 shows optimization of reaction temperature.

The cell lysis buffer for coupling reaction was prepared according to Example 6. 1 ml of coupling reaction system containing 40 mg/ml of cell lysis buffer, 20 mmol/L of Reb A, 200 mmol/L of sucrose, 10% of DMSO (v/v), and a buffer (100 mmol/L of KPi with pH 8.0 and 100 mmol/L of NaCl) was reacted for 6 h. After the completion of the reaction, 5 times of volume of methanol was added to terminate the reaction. Then methanol was added to make a 6-fold dilution. The diluted solution was centrifuged at 20000×g for 5 min, the supernatant was subjected to suction filtration through a 0.22 μM filter membrane, and UPLC was carried out for detection and analysis. The liquid chromatography was carried out according to Example 3, and the yield of Reb D was calculated. The result showed that when the temperature was 30-40° C., the yield of Reb D could reach 50% or above (FIG. 9).

EXAMPLE 9 EFFECT OF DMSO CONCENTRATION ON GLYCOSYLATION COUPLING REACTION OF GLYCOSYLTRANSFERASE AND SUCROSE SYNTHASE

Different concentrations of DMSO (5%-25% (v/v)) were added to a glycosylation coupling reaction system, and the reaction was carried out. The effect of DMSO concentration on glycosylation coupling reaction of glycosyltransferase and sucrose synthase was determined.

Figure 10:
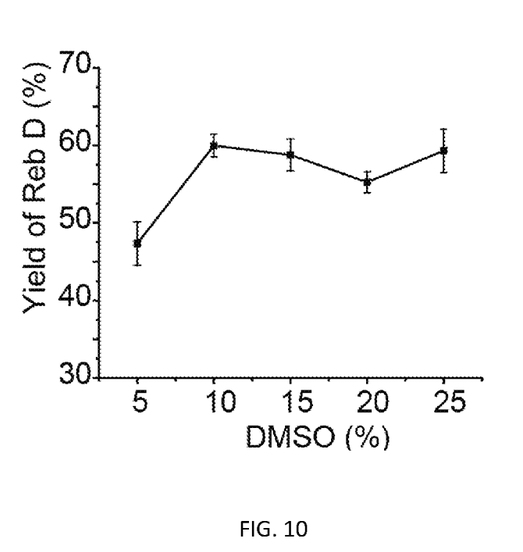
FIG. 10 shows optimization of the ratio of DMSO.

The cell lysis buffer for coupling reaction was prepared according to Example 6. 1 ml of coupling reaction system containing 40 mg/ml of cell lysis buffer, 20 mmol/L of Reb A, 200 mmol/L of sucrose, DMSO (5%-25% (v/v)) and a buffer (100 mmol/L of KPi with pH 8.0 and 100 mmol/L of NaCl) was reacted at 35° C. for 6 h. After the completion of the reaction, 5 times of volume of methanol was added to terminate the reaction. Then a 6-fold dilution was made. The diluted solution was centrifuged at 20000×g for 5 min, the supernatant was subjected to suction filtration through a 0.22

μM filter membrane, and UPLC was carried out for detection and analysis. The liquid chromatography was carried out according to Example 3, and the yield of Reb D was calculated. The result showed that when the DMSO concentration was 10%-25% (v/v), the yield of Reb D could reach 55% or above (FIG. 10).

EXAMPLE 10 EFFECT OF SUCROSE CONCENTRATION ON GLYCOSYLATION COUPLING REACTION OF GLYCOSYLTRANSFERASE AND SUCROSE SYNTHASE

Different concentrations of sucrose (0-800 mmol/L) were added to a glycosylation coupling reaction system, and the reaction was carried out. The effect of sucrose concentration on glycosylation coupling reaction of glycosyltransferase and sucrose synthase was determined.

Figure 11:
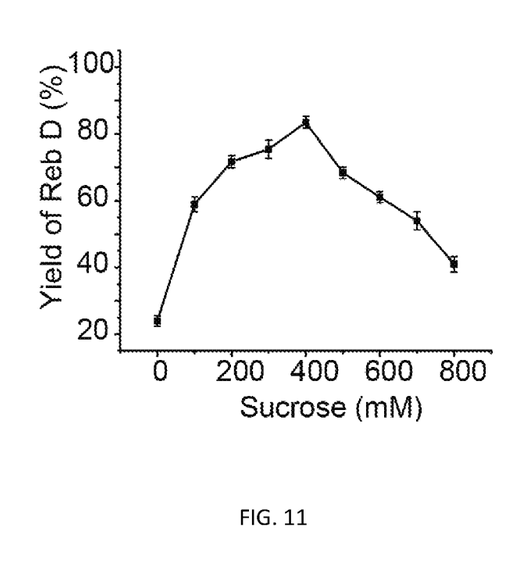
FIG. 11 shows optimization of sucrose concentration.

The cell lysis buffer for coupling reaction was prepared according to Example 6. 1 ml of coupling reaction system containing 40 mg/ml of cell lysis buffer, 20 mmol/L of Reb A, sucrose (0-800 mmol/L), 10% (v/v) of DMSO and a buffer (100 mmol/L of KPi with pH 8.0 and 100 mmol/L of NaCl) was reacted at 35° C. for 6 h. After the completion of the reaction, 5 times of volume of methanol was added to terminate the reaction. Then a 5-fold dilution was made. The diluted solution was centrifuged at 20000×g for 5 min, the supernatant was subjected to suction filtration through a 0.22 μM filter membrane, and UPLC was carried out for detection and analysis. The liquid chromatography was carried out according to Example 3, and the yield of Reb D was calculated. The result showed that when the sucrose concentration was 200-500 mmol/L, the yield of Reb D could reach 60% or above (FIG. 11).

EXAMPLE 11 EFFECT OF THE SUBSTRATE REB A CONCENTRATION ON COUPLING REACTION OF GLYCOSYLTRANSFERASE AND SUCROSE SYNTHASE

Different concentrations of Reb A (1-50 mmol/L) were added to a glycosylation coupling reaction system, and the reaction was carried out. The effect of Reb A concentration on glycosylation coupling reaction of glycosyltransferase and sucrose synthase was determined.

Figure 12:
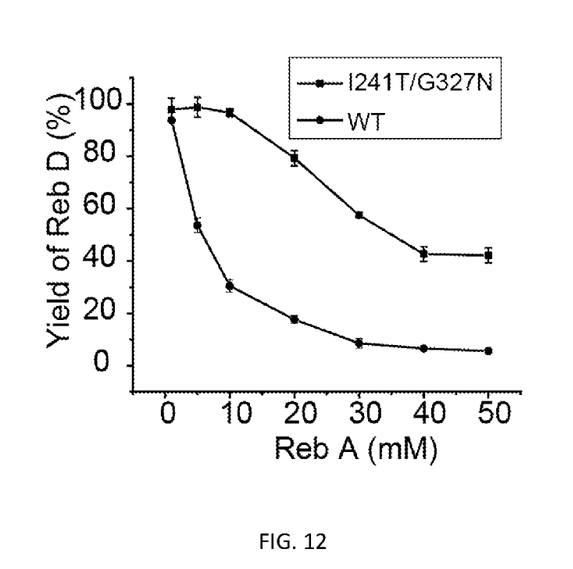
FIG. 12 shows comparison of the synthetic efficiency of Reb D at different concentrations of Reb A for YojK-I241T/G327N-AtSuSy and YojK-AtSuSy cascade reaction systems.

The cell lysis buffer for coupling reaction was prepared according to Example 6. 1 ml of coupling reaction system containing 40 mg/mL of cell lysis buffer, Reb A (1-50 mmol/L), 400 mmol/L of sucrose, 10% (v/v) of DMSO and a buffer (100 mmol/L of KPi with pH 8.0 and 100 mmol/L of NaCl) was reacted at 35° C. for 6 h. After the completion of the reaction, 5 times of volume of methanol was added to terminate the reaction. Then a 5-fold dilution was made. The diluted solution was centrifuged at 20000×g for 5 min, the supernatant was subjected to suction filtration through a 0.22 μM filter membrane, and ultra-high performance liquid chromatography (UPLC) was carried out for detection and analysis. The liquid chromatography was carried out according to Example 3, and the yield of Reb D was calculated. The result showed that when the substrate concentration was 20 mmol/L, 17.88 g/L of Reb D could be obtained with a yield of 79.27% (FIG. 12).

EXAMPLE 12 EFFECT OF REACTION TIME ON COUPLING REACTION OF GLYCOSYLTRANSFERASE AND SUCROSE SYNTHASE

A glycosylation coupling reaction system was reacted for different times (0-24 h), and the effect of reaction time on glycosylation coupling reaction of glycosyltransferase and sucrose synthase was determined.

Figure 13:
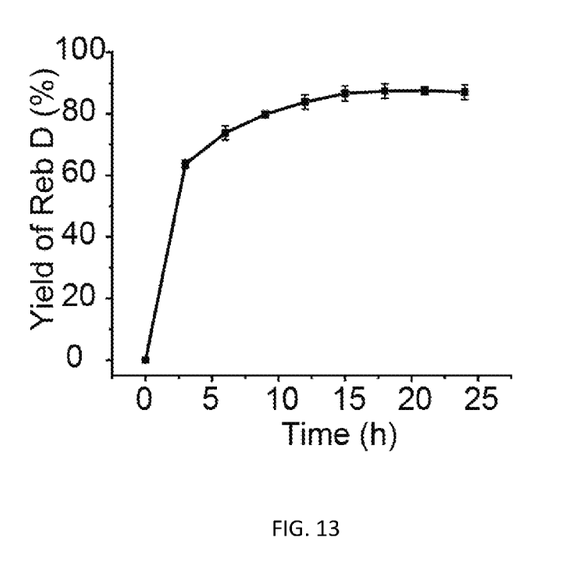
FIG. 13 shows optimization of the reaction time on a large-scale preparation of Reb D. Error bars mean the standard deviation of three repeats.

The cell lysis buffer for coupling reaction was prepared according to Example 6. 20 ml of coupling reaction system containing 40 mg/ml of cell lysis buffer, 20 mmol/L of Reb A, 400 mmol/L of sucrose, 10% (v/v) of DMSO, a buffer (100 mmol/L of KPi with pH 8.0 and 100 mmol/L of NaCl) and 1 mmol/L of UDPG was reacted at 35° C. The reaction time was optimized in a range of 0-24 h. After the completion of the reaction, 5 times of volume of methanol was added to terminate the reaction. Then a 5-fold dilution was made. The diluted solution was centrifuged at 20000×g for 5 min, the supernatant was subjected to suction filtration through a 0.22 μM filter membrane, and ultra-high performance liquid chromatography (UPLC) was carried out for detection and analysis. The liquid chromatography was carried out according to Example 3, and the yield of Reb D was calculated. The result showed that when the final reaction time was 15 h, 20.59 g/L of Reb D could be obtained from Reb A at the concentration of 20 mmol/L with a yield of 91.29% (FIG. 13), which was higher than the yield of 74.6% in the production of 17.4 g/L Reb D from 20 g/L Reb A reported in documents.

Although the disclosure has been disclosed as above by way of the preferred examples, they are not intended to limit the disclosure. Any person skilled in the art can make various changes and modifications without departing from the spirit and scope of the disclosure. Therefore, the protection scope of the disclosure should be as defined in the claims.

---

What is claimed is:

1. A glycosyltransferase, wherein an amino acid sequence of the glycosyltransferase is set forth in SEQ ID NO. 1.

2. A recombinant strain expressing the glycosyltransferase according to claim 1.

3. The recombinant strain according to claim 2, wherein the recombinant strain also expresses a sucrose synthase.

4. The recombinant strain according to claim 3, wherein an amino acid sequence of the sucrose synthase is an amino acid sequence with sucrose synthase activity derived from any source.

5. The recombinant strain according to claim 4, wherein the amino acid sequence of the sucrose synthase is set forth in SEQ ID NO. 2.

6. The recombinant strain according to claim 2, wherein E. coli is used as a host cell.

7. A method for catalytic synthesis of Rebaudioside D (Reb D), comprising carrying out a catalytic reaction on Reb A as a substrate by using a cell lysis buffer of the recombinant strain according to claim 2.

8. The method for catalytic synthesis of Reb D according to claim 7, wherein the cell lysis buffer is a supernatant obtained by cell lysis after induced expression of the recombinant strain.

9. The method for catalytic synthesis of Reb D according to claim 7, wherein conditions of the catalytic reaction are as follows: in a reaction system containing 1-50 mmol/L of Reb A, 0-800 mmol/L of sucrose, 5-25% v/v of DMSO, 100 mmol/L of $K_2HPO_4$—$KH_2PO_4$ buffer and 100 mmol/L of NaCl, the reaction is carried out at 20-45° C. for 0-48 hours.

10. The method for catalytic synthesis of Reb D according to claim 9, wherein the reaction system further contains uridine diphosphate glucose.

11. The method for catalytic synthesis of Reb D according to claim 9, wherein the buffer has a pH of 5.5-9.0.

* * * * *